US009706262B2

(12) United States Patent
Muramatsu et al.

(10) Patent No.: US 9,706,262 B2
(45) Date of Patent: Jul. 11, 2017

(54) NON-TRANSITORY COMPUTER-READABLE RECORDING MEDIUM, DETERMINATION METHOD, AND DETERMINATION DEVICE

(71) Applicant: FUJITSU LIMITED, Kawasaki-shi, Kanagawa (JP)

(72) Inventors: Tatsuma Muramatsu, Kawasaki (JP); Atsushi Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 15/049,867

(22) Filed: Feb. 22, 2016

(65) Prior Publication Data

US 2016/0269805 A1 Sep. 15, 2016

(30) Foreign Application Priority Data

Mar. 13, 2015 (JP) .................................. 2015-051082

(51) Int. Cl.
| | |
|---|---|
| H04N 21/81 | (2011.01) |
| H04N 21/431 | (2011.01) |
| G06K 9/00 | (2006.01) |
| H04N 21/234 | (2011.01) |
| G06K 9/62 | (2006.01) |

(52) U.S. Cl.
CPC ..... *H04N 21/8133* (2013.01); *G06K 9/00724* (2013.01); *G06K 9/6202* (2013.01); *H04N 21/23418* (2013.01); *H04N 21/4316* (2013.01)

(58) Field of Classification Search
CPC ......... H04N 21/8133; H04N 21/23418; H04N 21/4316; G06K 9/00724; G06K 9/6202
See application file for complete search history.

(56) References Cited

U.S. PATENT DOCUMENTS

| | | | | |
|---|---|---|---|---|
| 2014/0168517 A1* | 6/2014 | Petajan | ............. | G06F 17/30038 348/576 |
| 2015/0131845 A1* | 5/2015 | Forouhar | ........... | G06K 9/00724 382/100 |
| 2015/0235076 A1* | 8/2015 | Aimonen | ........... | G06K 9/00342 348/157 |

(Continued)

FOREIGN PATENT DOCUMENTS

JP 2006-204420 8/2006

OTHER PUBLICATIONS

Aydin, Serhat et al., "An Evaluation of Possession Information in Playfield Zones from Soccer Video Using Mid-level Descriptors", Multimedia Signal Processing, 2008 IEEE 10th Workshop on, IEEE, Piscataway, NJ, USA, Oct. 8, 2008, pp. 680-684, XP031356714.

(Continued)

*Primary Examiner* — David F Dunphy
(74) *Attorney, Agent, or Firm* — Fujitsu Patent Center (57) ABSTRACT

A determination device according to the present embodiment, detects a center line from video that is obtained by capturing a match-up type game for going into a goal that is provided on an opposing team's territory, conducted in a field, where one of territories is separated from other one of the territories by using the center line and outputs an index as to which team is more superior in the game in accordance with a determination result as to which one of the territories, separated by using the detected center line, mainly appears in the video.

18 Claims, 8 Drawing Sheets

(56) References Cited

U.S. PATENT DOCUMENTS

2015/0248917 A1* 9/2015 Chang ................ H04N 21/8549
386/282
2016/0158625 A1* 6/2016 DeAngelis ............ H04W 4/008
340/539.13
2016/0365121 A1* 12/2016 DeCaprio ............ G11B 27/036
2017/0032191 A1* 2/2017 Ackland ............ G06K 9/00724

OTHER PUBLICATIONS

Beck, Nikolaus et al., "Modeling team performance; Theoretical and empirical annotations on the analysis of football data", Empirical Economics; A Quarterly Journal of the Institute for Advanced Studies, Vienna, Austria, Springer, Berlin, DE, vol. 43, No. 1, Apr. 21, 2011, pp. 335-356, XP035083261.
Extended European Search Report dated Aug. 19, 2016 for corresponding European Patent Application No. 16156662.5, 8 pages.

* cited by examiner

| FRAME IDENTIFICATION NUMBER | TIME | HOME | AWAY |
|---|---|---|---|
| f1001 | 0 | 0.2 | |
| f1002 | 0.03 | 0.3 | |
| f1003 | 0.07 | 0.4 | |
| f1004 | 0.1 | DISAPPEARANCE | |
| f1005 | 0.13 | 0.3 | |
| f1006 | 0.17 | 0.2 | |
| f1007 | 0.2 | 0.1 | |
| f1008 | 0.23 | 0 | 0 |
| f1009 | 0.27 | | 0.1 |
| f1010 | 0.3 | | 0.2 |
| f1011 | 0.33 | | 0.3 |
| f1012 | 0.37 | | DISAPPEARANCE |
| f1013 | 0.4 | | 0.4 |
| f1014 | 0.43 | - | - |
| ... | ... | ... | ... |

NON-TRANSITORY COMPUTER-READABLE RECORDING MEDIUM, DETERMINATION METHOD, AND DETERMINATION DEVICE

CROSS-REFERENCE TO RELATED APPLICATION(S)

This application is based upon and claims the benefit of priority of the prior Japanese Patent Application No. 2015-051082, filed on Mar. 13, 2015, the entire contents of which are incorporated herein by reference.

FIELD

The embodiment discussed herein is directed to a determination program, or the like.

BACKGROUND

In recent years, there have been attempts to provide users, who miss various types of sports broadcasting, with data that represents more realistic feelings as well as winning or losing and scores. For example, to provide users with the result of a soccer game, there is a conventional technology for also providing the ball possession rate of each team. Soccer is a sport for competing in the number of times the ball is scored at the opposing goal, and it is fundamental to keep the ball and make an offensive move to the opposing territory. Therefore, the ball possession rate is often used as the index for determining the team that is giving offense, and a user sees the ball possession rate so as to assume superiority/inferiority of the teams. These related-art examples are described, for example, in Japanese Laid-open Patent Publication No. 2006-204420.

SUMMARY

According to an aspect of an embodiment, a non-transitory computer-readable recording medium stores therein a determination program that causes a computer to execute a process including detecting a center line from video that is obtained by capturing a match-up type game for going into a goal that is provided on an opposing team's territory, conducted in a field, where one of territories is separated from other one of the territories by using the center line and outputting an index as to which team is more superior in the game in accordance with a determination result as to which one of the territories, separated by using the detected center line, mainly appears in the video.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, the above-described conventional technology has a problem in that it is difficult to notify a user of superiority/inferiority of teams.

For example, because of the nature of the sport soccer, there is a situation where the team keeping the ball has some difficulties in making an offensive move to the opposing team. For instance, assuming the situation where a team A is good at defense and a team B is unable to take the offensive, although the ball possession rate of the team B is high, it is sometimes difficult to say that the team B is more superior to the team A. Furthermore, in the case of a short-term game, such as tournament, for example, there is a case where, if a strong team plays with a lower rank team, it does not aggressively keep the ball so as to save the physical power and, in that case, the ball possession rate of the lower rank team is high. That is, it is sometimes difficult to determine superiority/inferiority of teams by using only the ball possession rate.

Preferred embodiments of the present invention will be explained with reference to accompanying drawings. Furthermore, the present invention is not limited to the embodiment.

Figure 1:
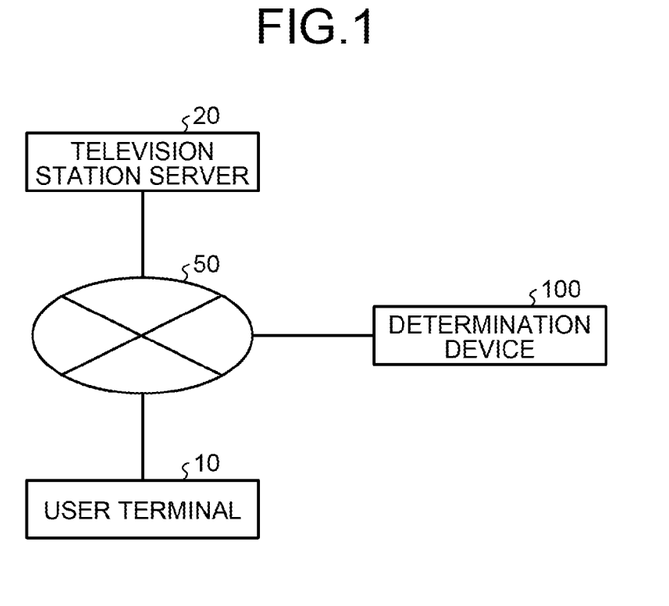
FIG. 1 is a diagram that illustrates a configuration of a system according to the present embodiment.

FIG. 1 is a diagram that illustrates a configuration of a system according to the present embodiment. As illustrated in FIG. 1, the system includes a user terminal 10, a television station server 20, and a determination device 100. The user terminal 10, the television station server 20, and the determination device 100 are connected to a network 50. Here, only the user terminal 10 is illustrated as an example; however, the system according to a first embodiment may include other user terminals.

The user terminal 10 is a device that receives video data on a TV program, or the like, from the television station server 20 and that displays the received video data. For example, the user terminal 10 is equivalent to a device, such as a personal computer (PC) or a television. Furthermore, the user terminal 10 may receive video data via the network 50 or may receive video data via radio waves that are generated by a radio tower, or the like.

The television station server 20 is a server that provides the user terminal 10 with various types of video data on TV programs, or the like. Furthermore, the television station server 20 transmits, for example, the video data on soccer broadcasting to the determination device 100 and receives, from the determination device 100, information on the index that indicates which one of the teams playing the soccer game is more superior. In the following explanation, the information on the index that indicates which team is more superior is referred to as the "superiority/inferiority index information" as appropriate. The television station server 20 transmits the superiority/inferiority index information to the user terminal 10.

The determination device 100 is a device that generates the superiority/inferiority index information on the basis of the video data on soccer broadcasting, which is received from the television station server 20. For example, the determination device 100 performs image processing on the video data to detect the center line that is present on the soccer field. Furthermore, the determination device 100 generates the superiority/inferiority index information by using the determination result as to which territory mainly appears in the video among the territories that are separated by using the detected center line. The determination device 100 transmits the generated superiority/inferiority index information to the television station server 20.

Figure 2:
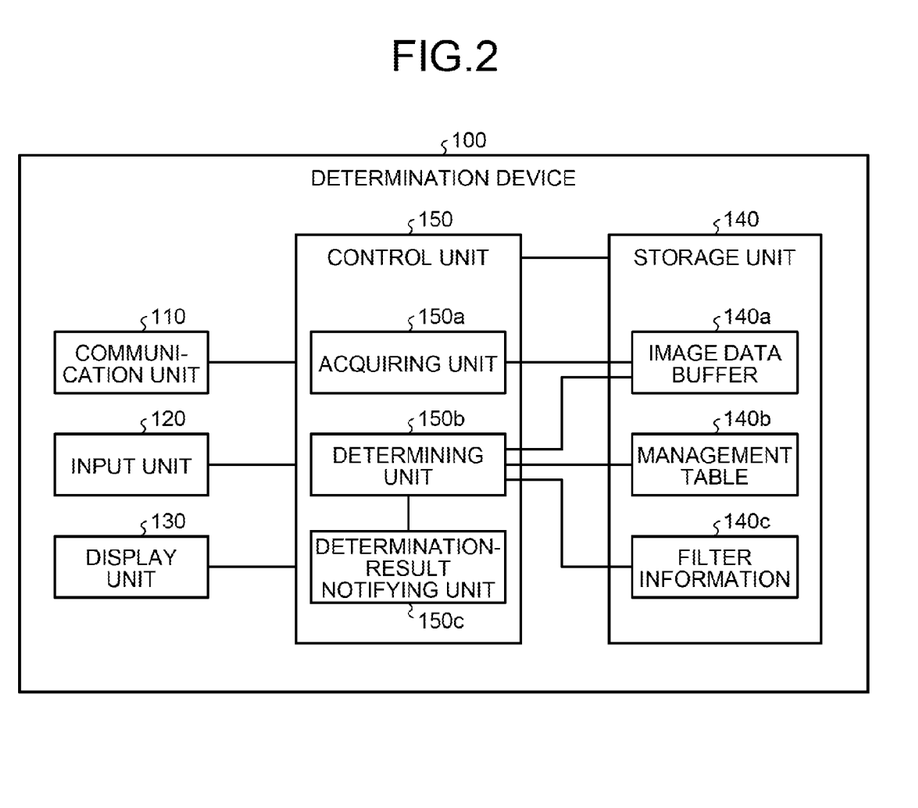
FIG. 2 is a functional block diagram that illustrates a configuration of a determination device according to the present embodiment.

Next, an explanation is given of an example of the configuration of the determination device 100, illustrated in FIG. 1. FIG. 2 is a functional block diagram that illustrates a configuration of the determination device according to the present embodiment. As illustrated in FIG. 2, the determination device 100 includes a communication unit 110, an input unit 120, a display unit 130, a storage unit 140, and a control unit 150.

The communication unit 110 is a processing unit that performs data communication with a different device via the network 50. For example, the communication unit 110 is equivalent to a communication device, or the like. For example, upon receiving the video data on soccer broadcasting from the television station server 20, the communication unit 110 outputs the received video data to the control unit 150. The control unit 150 communicates data with the television station server 20 via the communication unit 110.

The input unit 120 is an input device that inputs various types of information to the determination device 100. For example, the input unit 120 is equivalent to a keyboard, mouse, touch panel, or the like.

The display unit 130 is a display device that displays various types of data that is output from the control unit 150. For example, the display unit 130 is equivalent to a liquid crystal display, a touch panel, or the like.

The storage unit 140 includes an image data buffer 140*a*, a management table 140*b*, and filter information 140*c*. The storage unit 140 is equivalent to a storage device, such as a semiconductor memory device, e.g., a random access memory (RAM), a read only memory (ROM), or a flash memory.

The image data buffer 140*a* is a buffer that stores the video data on soccer broadcasting. For example, the video data contains multiple continuous image frames. In the present embodiment, for example, an explanation is given of a case where "the home team" and "the away team" play a soccer game. Furthermore, the image frame is related to the frame identification number for uniquely identifying an image frame and the information on the time that elapses after the game starts.

Figure 3:
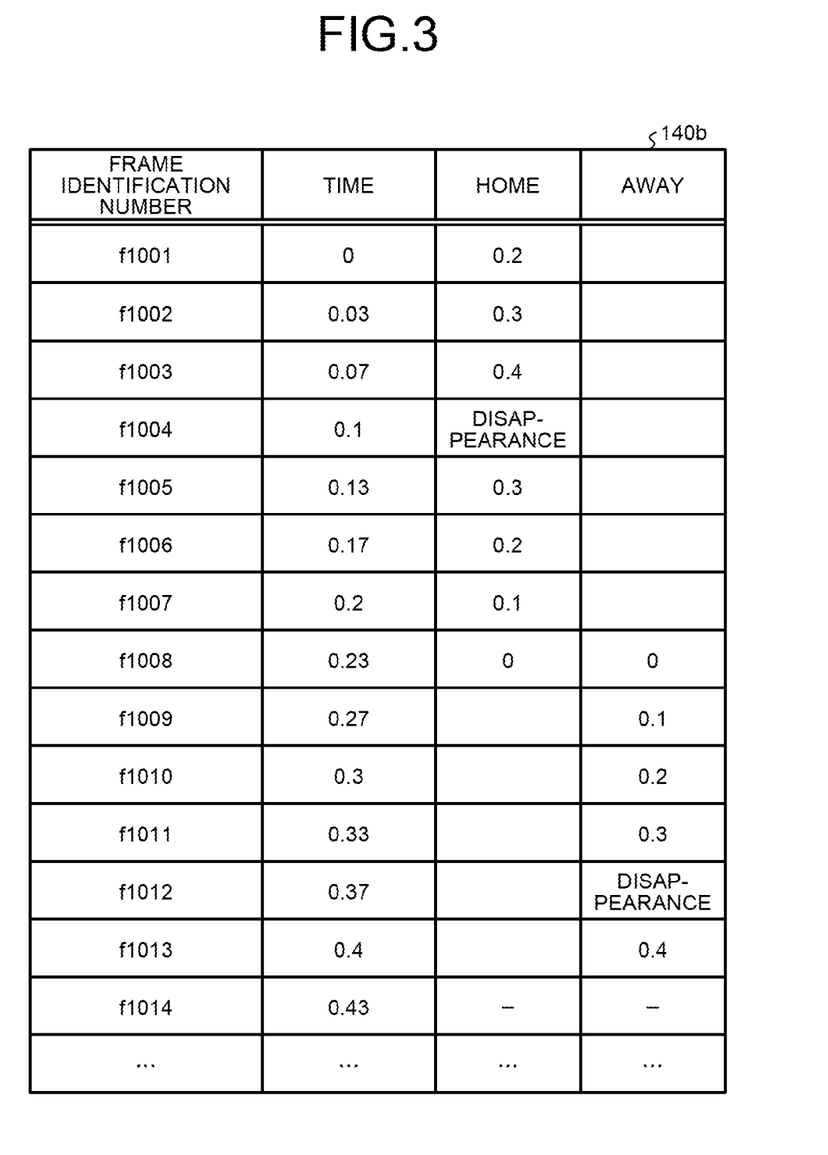
FIG. 3 is a diagram that illustrates an example of the data structure of a management table.

The management table 140*b* is a table that stores, for each image frame, the positional information on the center line in the soccer field, which is detected from the image frame. FIG. 3 is a diagram that illustrates an example of the data structure of the management table. As illustrated in FIG. 3, frame identification number, Time, Home, and Away are related to one another in the management table 140*b*. Frame identification number is the information for uniquely identifying an image frame. Time corresponds to, for example, the time that elapses after the soccer game starts.

Home is the information that indicates how much the center line moves from the reference position in the direction opposite to the direction in which the home team makes an offensive move. For example, as the number of Home increases, it means that the home team plays more in front of the goal of the away team. Furthermore, in the management table 140*b* of FIG. 3, "disappearance", which is included in the field of Home, indicates that the center line on the image frame moves out in the direction opposite to the direction in which the home team makes an offensive move and is not present on the image frame.

Furthermore, if the center line moves from the reference position in the direction in which the home team makes an offensive move, the number of Home in the management table 140*b* is blank.

Away is the information that indicates how much the center line moves from the reference position in the direction opposite to the direction in which the away team makes an offensive move. For example, as the number of Away increases, it means that the away team plays more in front of the goal of the home team. Furthermore, in the management table 140*b* of FIG. 3, "disappearance", which is included in the field of Away, indicates that the center line on the image frame moves out in the direction opposite to the direction in which the away team makes an offensive move and is not present on the image frame.

Furthermore, if the center line moves from the reference position in the direction in which the away team makes an offensive move, the number of Away in the management table 140*b* is blank.

Figure 4:
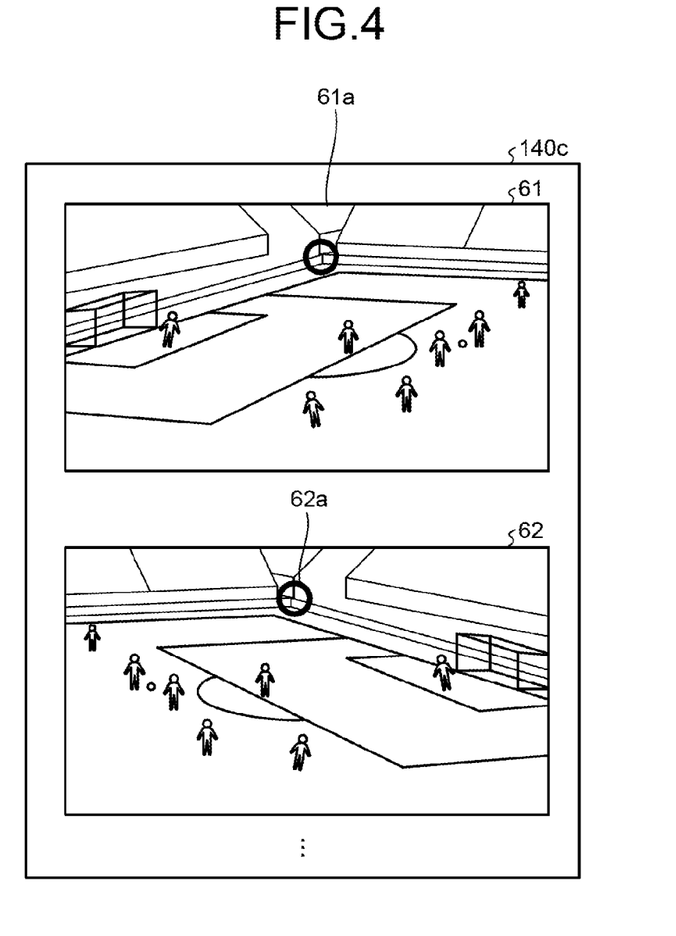
FIG. 4 is a diagram that illustrates an example of the template that is included in filter information.

Return to the explanation of FIG. 2. The filter information 140*c* includes templates of image frames that do not include the center line and that indicate the front of the goal. FIG. 4 is a diagram that illustrates an example of the template that is included in the filter information. For example, as illustrated in templates 61 and 62 of FIG. 4, in the image frames that do not include the center line and that indicate the front of the goal, corners 61*a* and 62*a* of the soccer field are located in the center of the upper section of the image frame. Here, the templates 61 and 62 are illustrated; however, the filter information 140*c* may include other templates.

The control unit 150 includes an acquiring unit 150*a*, a determining unit 150*b*, and a determination-result notifying unit 150*c*. The control unit 150 is equivalent to, for example, an integrated device, such as an application specific integrated circuit (ASIC) or a field programmable gate array (FPGA). Furthermore, the control unit 150 is equivalent to, for example, an electronic circuit, such as a central processing unit (CPU) or a micro processing unit (MPU).

The acquiring unit 150*a* is a processing unit that acquires video data from the television station server 20. The acquiring unit 150*a* stores the acquired video data in the image data buffer 140*a*.

The determining unit 150*b* is a processing unit that detects the center line on the basis of each image frame, stored in the image data buffer 140*a*, and determines which one of the territories, separated by using the detected center line, mainly appears in the video. The determining unit 150*b* uses the determination result to generate the superiority/inferiority index information and outputs the generated superiority/inferiority index information to the determination-result notifying unit 150*c*.

The determination-result notifying unit 150*c* is a processing unit that notifies the television station server 20 of the superiority/inferiority index information that is acquired from the determining unit 150*b*.

Next, a specific explanation is given of an example of the operation of the determining unit 150b. The determining unit 150b performs an operation to remove an image frame that is being zoomed, an operation to detect the center line from an image frame and register various types of information in the management table 140b, and an operation to generate the superiority/inferiority index information on the basis of the management table 140b.

Figure 5:
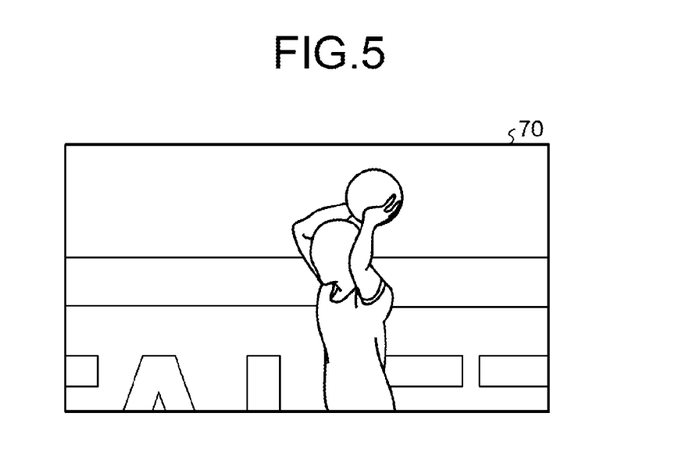
FIG. 5 is a diagram that illustrates an example of the image frame that is being zoomed.

An explanation is given of the operation to remove an image frame that is being zoomed by the determining unit 150b. For example, the image frame that is being zoomed, where the image of a player is zoomed in, does not include the center line; therefore, the determining unit 150b eliminates the image frame that is being zoomed from the target image frames, from which the center line is to be detected. FIG. 5 is a diagram that illustrates an example of the image frame that is being zoomed. For example, an image frame 70 that is being zoomed, illustrated in FIG. 5, includes a signboard, or the like, and the frame of the signboard, or the like, is sometimes mistakenly detected as the center line.

The determining unit 150b may use any technique to detect an image frame that is being zoomed. For example, the determining unit 150b calculates the difference between an image frame A1 and an image frame A2 that are adjacent to each other and, if the calculated difference value is equal to or more than a threshold, detects the image frame A2 as an image frame that is being zoomed.

Figure 6:
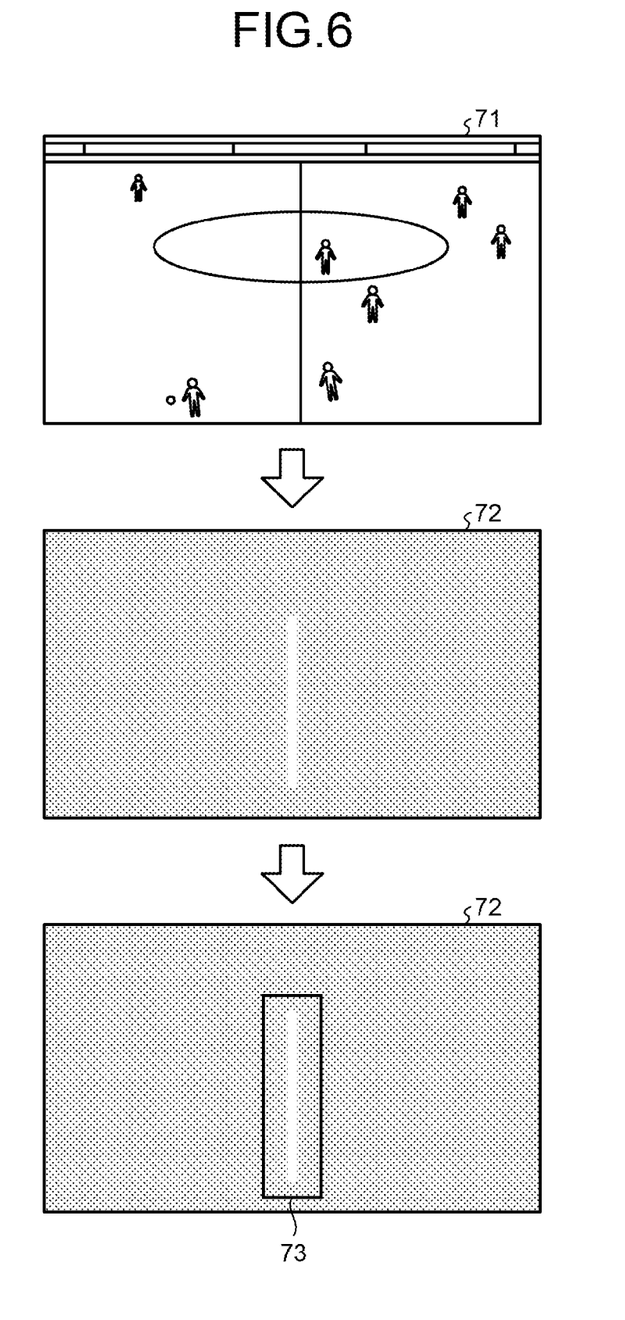
FIG. 6 is a diagram that illustrates an operation to extract the center line from an image frame.

An explanation is given of the operation to detect the center line from image frame and to register various types of information in the management table 140b by the determining unit 150b. FIG. 6 is a diagram that illustrates an operation to extract the center line from the image frame. As illustrated in FIG. 6, the determining unit 150b performs binarization processing on an image frame 71 to extract an edge, thereby generating an edge image 72. The determining unit 150b may perform an operation to remove, from the edge image 72, the edge whose length is less than a threshold. The determining unit 150b compares the straight line information on the previously set center line with the edge image 72, thereby detecting a center line 73.

After detecting the center line, the determining unit 150b determines in which one of "Home" and "Away" in the management table the number is to be registered on the basis of the position of the center line and registers the distance between the reference position and the position of the center line in the determined area.

Figure 7:
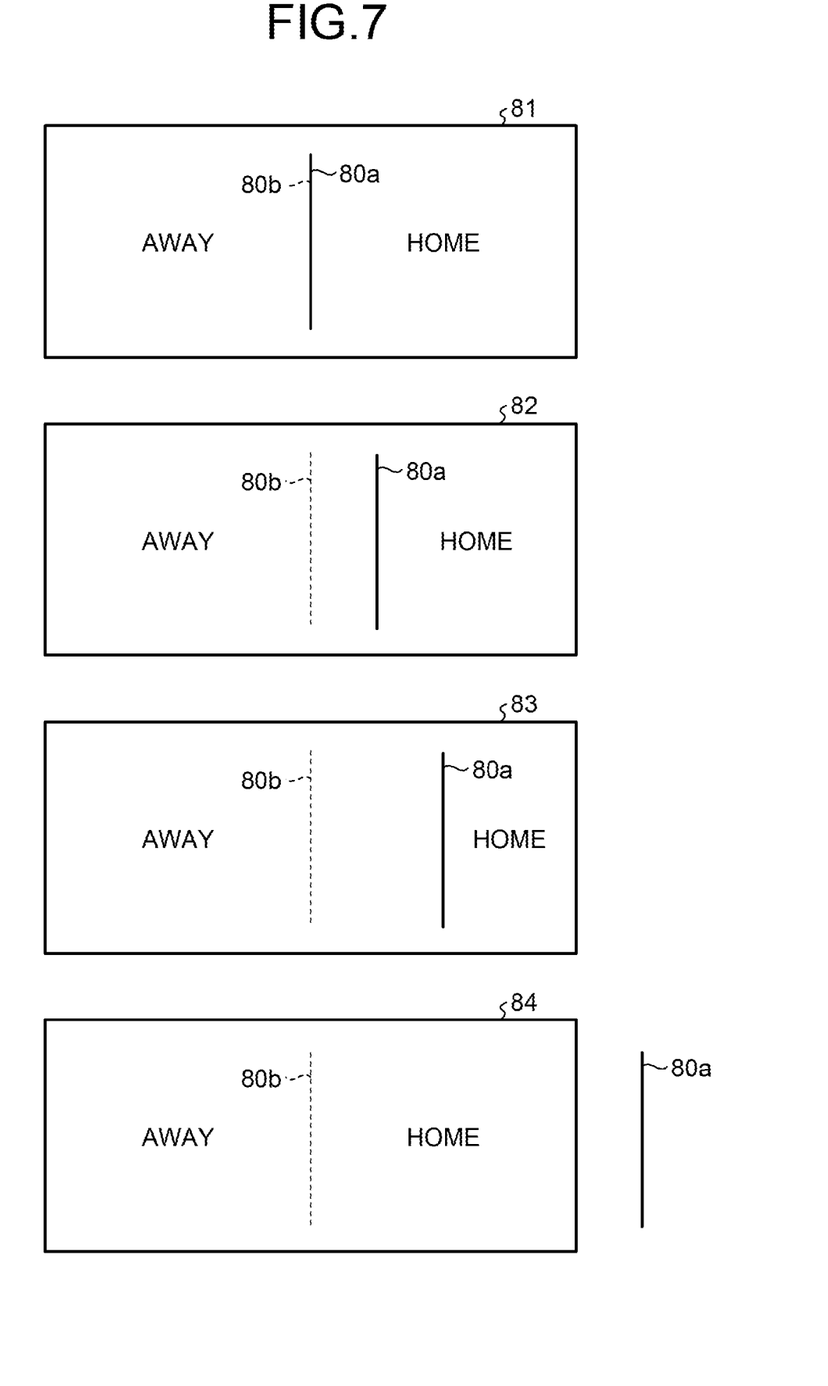
FIG. 7 is a diagram that illustrates an operation to register information in the management table by a determining unit.

FIG. 7 is a diagram that illustrates an operation to register information in the management table by the determining unit. In FIG. 7, for example, the left side of image frames 81 to 84 is the away team's territory, and the right side thereof is the home team's territory. Furthermore, the center line is a center line 80a, and the reference position is a reference position 80b. The determining unit 150b may determine the reference position by using any technique and, for example, the center position of the image frame at the start of the game is determined as the reference position.

For example, if the center line 80a moves to right and the away team's territory is mainly present in the image frame, it can be said that the home team makes an offensive move to the away team's territory and the home team is superior. Conversely, if the center line 80a moves to left and the home team's territory is mainly present in the image frame, it can be said that the away team makes an offensive move to the home team's territory and the away team is superior.

The operation of the determining unit 150b for the image frame 81 is explained. On the image frame 81, the center line 80a and the reference position 80b are overlapped with each other. In this case, the determining unit 150b sets "0" in the fields of Home and Away in relation to the frame identification number of the image frame 81 and the time. Furthermore, the determining unit 150b may perform the same operation in a case where the distance between the center line 80a and the reference position 80b is less than a threshold.

The operation of the determining unit 150b for the image frame 82 is explained. On the image frame 82, the center line 80a moves to the side of the home's territory, and the home team makes an offensive move to the away team's territory. In this case, the determining unit 150b sets, in the field of Home, the distance between the center line 80a and the reference position 80b in relation to the frame identification number of the image frame 82 and the time.

The operation of the determining unit 150b for the image frame 83 is explained. On the image frame 83, the center line 80a moves to the side of the home's territory, and the home team makes an offensive move to the away team's territory. In this case, the determining unit 150b sets, in the field of Home, the distance between the center line 80a and the reference position 80b in relation to the frame identification number of the image frame 83 and the time.

The operation of the determining unit 150b for the image frame 84 is explained. On the image frame 84, the center line 80a moves out on the side of the home's territory. In this case, the determining unit 150b sets "disappearance" in the field of Home in relation to the frame identification number of the image frame 84 and the time.

The determining unit 150b may determine the disappearance by using any technique. For example, there are image frames B1, B2, and B3, the distance between the center line and the reference position is equal to or more than a threshold and the center line is present on the home's territory in the image frames B1 and B3, and the center line is not present in the image frame B2. In this case, the determining unit 150b determines that the center line moves out on the side of the home's territory.

Conversely, assume that there are image frames C1, C2, and C3, the distance between the center line and the reference position is equal to or more than a threshold and the center line is present on the away's territory in the image frames C1 and C3, and the center line is not present in the image frame C2. In this case, the determining unit 150b determines that the center line moves out on the side of the away's territory.

Furthermore, when the determining unit 150b detects the center line from the image frame, it determines whether the characteristics of the image frame match the characteristics of the template, included in the filter information 140c. If the characteristics of the image frame match the characteristics of the template, the determining unit 150b refrains from detecting the center line from the image frame. For example, if the characteristics of the image frame match the characteristics of the template, there is a possibility that the image frame is the image frame that indicates the front of the goal; therefore, it is possible to prevent improper detection of the penalty arc, or the like, as the center line.

An explanation is given of the operation to generate the superiority/inferiority index information on the basis of the management table 140b by the determining unit 150b. For example, the determining unit 150b calculates the superiority value of the home team by using Equation (1) and calculates the superiority value of the away team by using Equation (2). For example, the information that is the combination of the superiority value of the home team and the superiority value of the away team is equivalent to the superiority/inferiority index information.

$$\text{Superiority value of home team} = \text{first time}/(\text{first time} + \text{second time}) \times 100 \quad (1)$$

$$\text{Superiority value of away team} = \text{second time}/(\text{first time} + \text{second time}) \times 100 \quad (2)$$

In Equations (1) and (2), the first time is the time, during which the home team makes an offensive move to the away's territory. For example, the determining unit 150b calculates the first time as described below. Out of the records in the management table 140b, the number of the records, in which the number larger than zero or the disappearance is set in the field of Home, is multiplied by the time per one image frame and the multiplied values are add to calculate the first time.

In Equations (1) and (2), the second time is the time, during which the away team makes an offensive move to the home's territory. For example, the determining unit 150b calculates the second time as described below. Out of the records in the management table 140b, the number of records, in which the number larger than zero or the disappearance is set in the field of Away, is multiplied by the time per one image frame, and the multiplied values are add to calculate the second time.

Furthermore, when calculating the first time, the determining unit 150b may apply a weight to a record that includes "disappearance" in the field of Home for calculation. For example, the determining unit 150b may calculate the first time as represented in Equation (3). In Equation (3), X is the time per one image frame. Record number A is the number of records, in which the number larger than zero is set in the field of Home. Record number B is the number of records, in which "disappearance" is set in the field of Home. α is a weight and, for example, an integer equal to or more than 1 is set.

$$\text{First time} = \text{time } X \times \text{record number } A + \alpha \times \text{time } X \times \text{record number } B \quad (3)$$

When calculating the second time, the determining unit 150b may apply a weight to a record that includes "disappearance" in the field of Away for calculation. For example, the determining unit 150b may calculate the second time as represented in Equation (4). In Equation (4), X is the time per one image frame. Record number C is the number of records, in which the number larger than zero is set in the field of Away. Record number D is the number of records, in which "disappearance" is set in the field of Away. α is a weight and, for example, an integer equal to or more than 1 is set.

$$\text{Second time} = \text{time } X \times \text{record number } C + \alpha \times \text{time } X \times \text{record number } D \quad (4)$$

Figure 8:
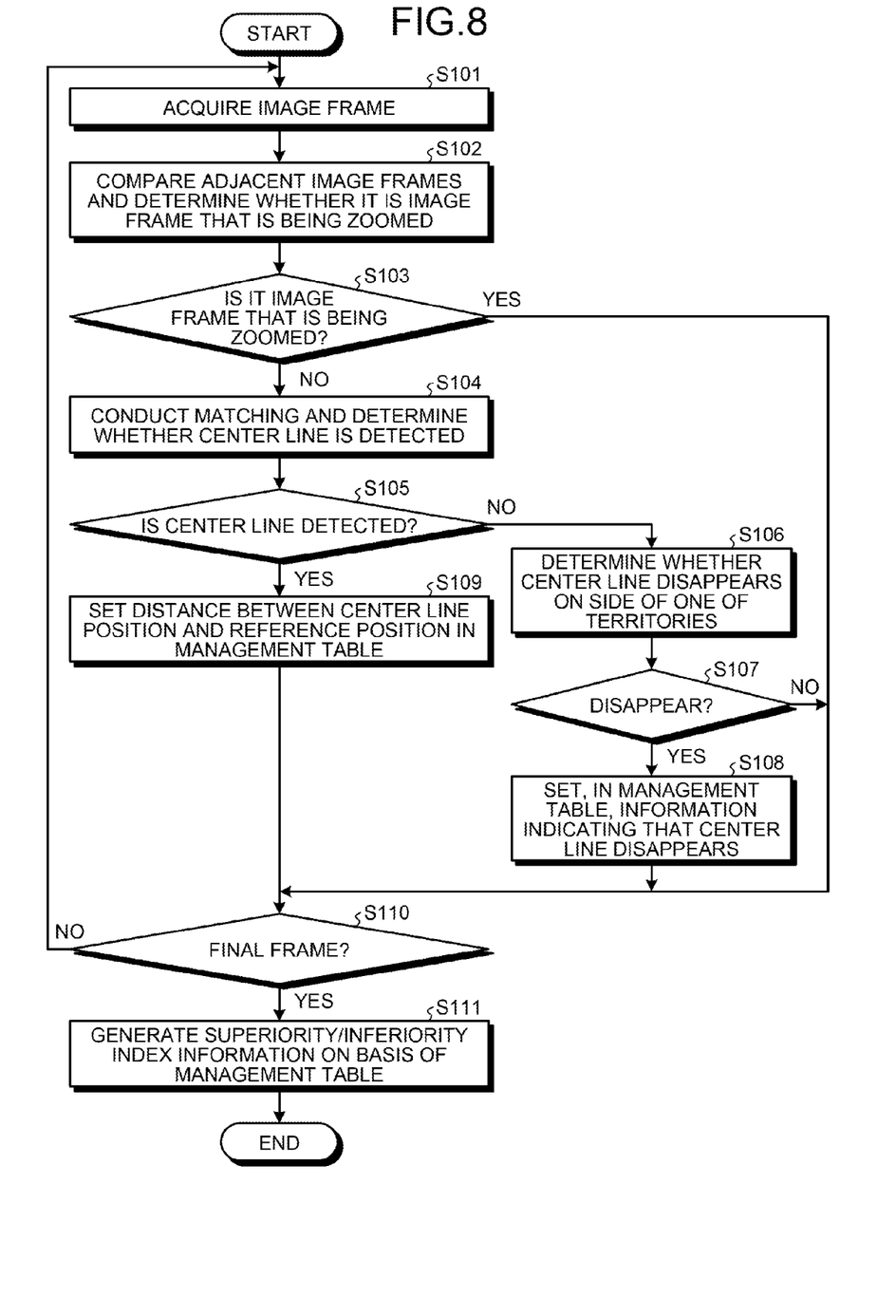
FIG. 8 is a flowchart that illustrates the steps of an operation of the determination device according to the present embodiment.

Next, an explanation is given of the steps of the operation of the determination device 100 according to the present embodiment. FIG. 8 is a flowchart that illustrates the steps of the operation of the determination device according to the present embodiment. The determining unit 150b of the determination device 100 acquires an image frame from the image data buffer 140a (Step S101), compares the adjacent image frames, and determines whether it is the image frame that is being zoomed (Step S102).

If it is the image frame that is being zoomed (Step S103, Yes), the determining unit 150b proceeds to Step S110. Conversely, if it is not the image frame that is being zoomed (Step S103, No), the determining unit 150b conducts matching and determines whether the center line is detected (Step S104).

If the center line is not detected (Step S105, No), the determining unit 150b determines whether the center line disappears on the side of one of the territories (Step S106). If the center line does not disappear on the side of one of the territories (Step S107, No), the determining unit 150b proceeds to Step S110.

Conversely, if the center line disappears on the side of one of the territories (Step S107, Yes), the determining unit 150b sets, in the management table 140b, the information indicating that the center line disappears (Step S108) and proceeds to Step S110.

Furthermore, at Step S105, if the center line is detected (Step S105, Yes), the determining unit 150b sets the distance between the center line position and the reference position in the management table 140b (Step S109) and proceeds to Step S110.

At Step S110, if it is not the final image frame (Step S110, No), the determining unit 150b proceeds to Step S101. Conversely, if it is the final image frame (Step S110, Yes), the determining unit 150b generates the superiority/inferiority index information on the basis of the management table 140b (Step S111).

Next, an explanation is given of the advantage of the determination device 100 according to the present embodiment. The determination device 100 performs image processing on each image frame to detect the center line that is present on the soccer field. Then, the determination device 100 uses the determination result as to which one of the territories, separated by using the detected center line, mainly appears in the video to generate the superiority/inferiority index information. For example, if the determination device 100 detects that the center line, detected in the image, moves to the side of one of the territories, it determines that the team on the side of one of the territories is more superior. Therefore, according to the present embodiment, it is possible to notify a user of superiority/inferiority of the team.

An explanation is given of a case where, for example, the home team and the away team are playing a game and the home team's territory mainly appears in the image. In this case, the determination device 100 determines that the away team is superior. In a case where the home team's territory mainly appears in the video, it can be said that the away team actually keeps the ball and makes an offensive move to the home team and that the away team is superior. Furthermore, in a case where the home team's territory mainly appears in the video, the away team keeps the ball in the home team's territory due to aggressive defensive, and it can be said that the away team is superior. Furthermore, in a case where the home team's territory mainly appears in the video, the away team sometimes keeps the ball near the flag in order to reduce the risks of the goal allowed just before the end of the game; therefore, it can be said that the away team is superior.

Furthermore, in a case where the determination device 100 detects that the detected center line disappears on the side of one of the territories, it is determined that the team on the side of one of the territories is more superior, compared to a case where it is detected that the detected center line moves to the side of one of the territories. For example, if the center line disappears on the side of the home team's territory, it can be said that the away team makes a more offensive move to the home team's territory; thus, it is possible to determine superiority/inferiority more accurately.

Furthermore, if the image area indicating the characteristics of neighborhood of the goal is detected from the image frame, the determination device 100 refrains from detecting the center line from the image frame. Therefore, it is possible to prevent improper detection of the center line from the image frame that does not include the center line. For example, it is possible to prevent detection of the line segment in the penalty area in front of the goal as the center line.

Figure 9:
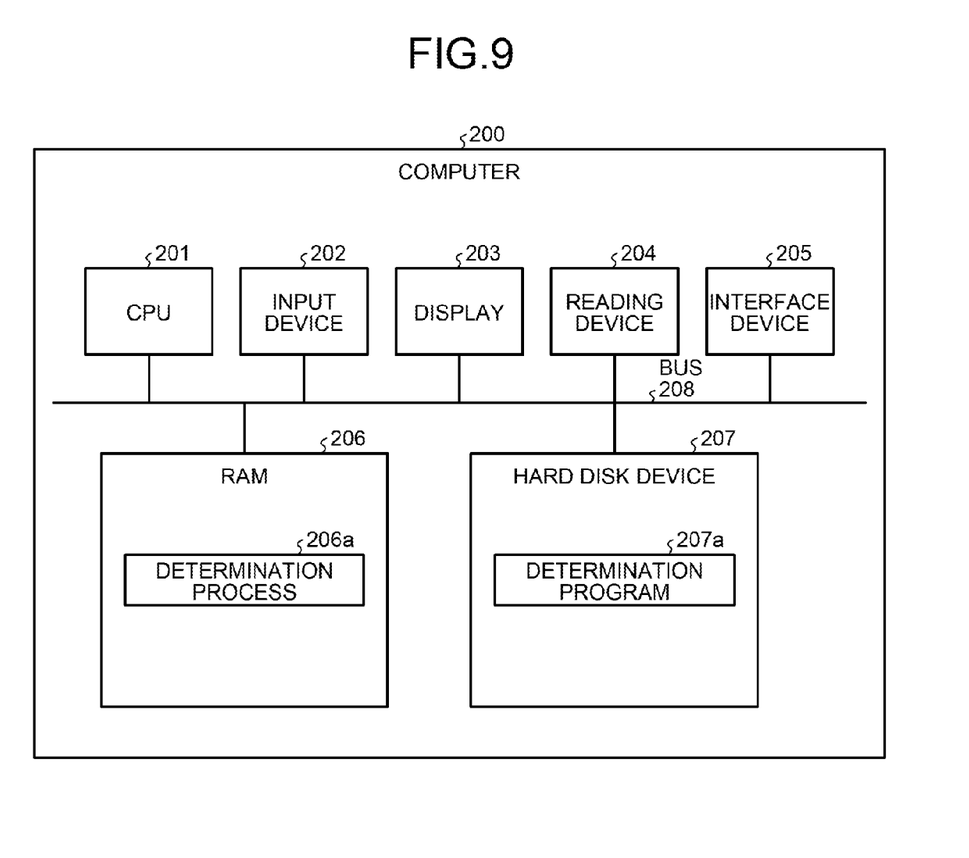
FIG. 9 is a diagram that illustrates an example of the computer that executes an image processing program.

Next, an explanation is given of an example of the computer that executes a determination program that implements the same functionality as that of the image processing device that is illustrated in the above-described embodiment. FIG. 9 is a diagram that illustrates an example of the computer that executes the image processing program.

As illustrated in FIG. 9, a computer 200 includes a CPU 201 that performs various calculation operations; an input device 202 that receives input of data from a user; and a display 203. Furthermore, the computer 200 includes a reading device 204 that reads a program, or the like, from a storage medium; and an interface device 205 that transfers and receives data to and from a different computer via a network. Furthermore, the computer 200 includes a RAM 206 that temporarily stores various types of information; and a hard disk device 207. Moreover, the CPU 201, the input device 202, the display 203, the reading device 204, the interface device 205, the RAM 206, and the hard disk device 207 are connected to a bus 208.

The hard disk device 207 includes, for example, a determination program 207*a*. The CPU 201 reads the determination program 207*a* and loads it into the RAM 206. The determination program 207*a* functions as a determination process 206*a*. The determination process 206*a* is equivalent to, for example, the determining unit 150*b*.

Furthermore, the determination program 207*a* does not always need to be stored in the hard disk device 207 initially. For example, each program is stored in a "portable physical medium", such as a flexible disk (FD), CD-ROM, DVD disk, magnet-optical disk, or IC card, which is inserted into the computer 200. Then, the computer 200 may read the determination program 207*a* from the above and execute it.

According to one aspect of the present invention, it is possible to notify a user of superiority/inferiority of a team.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a determination program that causes a computer to execute a process comprising:
   detecting a center line from video that is obtained by capturing a match-up type game for going into a goal that is provided on an opposing team's territory, conducted in a field, where one of territories is separated from other one of the territories by using the center line; and
   outputting an index as to which team is more superior in the game in accordance with a determination result as to which one of the territories, separated by using the detected center line, mainly appears in the video.

2. The non-transitory computer-readable recording medium according to claim 1, wherein the process further comprises determining that a team on a side of the one of the territories is more superior, when it is detected that the center line, detected in the video, moves to the side of the one of the territories.

3. The non-transitory computer-readable recording medium according to claim 2, wherein the determining determines that the team on a side of the one of the territories is more superior, when it is detected that the center line, detected in the video, disappears on the side of the one of the territories.

4. The non-transitory computer-readable recording medium according to claim 3, wherein the determining determines that the team on the side of the one of the territories is more superior, compared to a case where it is detected that the detected center line moves to the side of the one of the territories, when it is detected that the detected center line disappears on the side of the one of the territories.

5. The non-transitory computer-readable recording medium according to claim 4, wherein the process further comprises calculating a first time by adding a time that is obtained by applying a weight to a time, during which it is detected that the detected center line disappears on the side of the one of the territories, to a time, during which the center line is present on the side of the one of the territories and a second time by adding a time that is obtained by applying a weight to a time, during which it is detected that the center line disappears on a side of the other one of the territories, to a time, during which the center line is present on the side of the other one of the territories and outputting an index as to which one of the teams is more superior in the game based on the first time and the second time.

6. The non-transitory computer-readable recording medium according to claim 1, wherein the process further comprises refraining from detecting the center line from the video, when a video area indicating a characteristic of neighborhood of the goal is detected from the video.

7. A determination method that is implemented by a computer, the determination method comprising:
   detecting a center line from video that is obtained by capturing a match-up type game for going into a goal that is provided on an opposing team's territory, conducted in a field, where one of territories is separated from other one of the territories by using the center line; and
   outputting an index as to which team is more superior in the game in accordance with a determination result as to which one of the territories, separated by using the detected center line, mainly appears in the video.

8. The determination method according to claim 7, wherein the determination method further comprises determining that a team on a side of the one of the territories is more superior, when it is detected that the center line, detected in the video, moves to the side of the one of the territories.

9. The determination method according to claim 8, wherein the determining determines that the team on a side of the one of the territories is more superior, when it is detected that the center line, detected in the video, disappears on the side of the one of the territories.

10. The determination method according to claim 9, wherein the determining determines that the team on the side of the one of the territories is more superior, compared to a case where it is detected that the detected center line moves to the side of the one of the territories, when it is detected that the detected center line disappears on the side of the one of the territories.

11. The determination method according to claim 10, the process further comprises calculating a first time by adding a time that is obtained by applying a weight to a time, during which it is detected that the detected center line disappears on the side of the one of the territories, to a time, during which the center line is present on the side of the one of the territories and a second time by adding a time that is obtained by applying a weight to a time, during which it is detected that the center line disappears on a side of the other one of the territories, to a time, during which the center line is present on the side of the other one of the territories and outputting an index as to which one of the teams is more superior in the game based on the first time and the second time.

12. The determination method according to claim 7, wherein the determination method further comprises refraining from detecting the center line from the video, when a video area indicating a characteristic of neighborhood of the goal is detected from the video.

13. A determination device comprising:
a processor that executes a process comprising:
detecting a center line from video that is obtained by capturing a match-up type game for going into a goal that is provided on an opposing team's territory, conducted in a field, where one of territories is separated from other one of the territories by using the center line; and
outputting an index as to which team is more superior in the game in accordance with a determination result as to which one of the territories, separated by using the detected center line, mainly appears in the video.

14. The determination device according to claim 13, wherein, the process further comprises determining that a team on a side of the one of the territories is more superior, when it is detected that the center line, detected in the video, moves to the side of the one of the territories.

15. The determination device according to claim 14, wherein, wherein the determining determines that the team on a side of the one of the territories is more superior, when it is detected that the center line, detected in the video, disappears on the side of the one of the territories.

16. The determination device according to claim 15, wherein, the determining determines that the team on the side of the one of the territories is more superior, compared to a case where it is detected that the detected center line moves to the side of the one of the territories, when it is detected that the detected center line disappears on the side of the one of the territories.

17. The determination device according to claim 13, wherein, the process further comprises refraining from detecting the center line from the video, when a video area indicating a characteristic of neighborhood of the goal is detected from the video.

18. The determination device according to claim 17, wherein the process further comprises calculating a first time by adding a time that is obtained by applying a weight to a time, during which it is detected that the detected center line disappears on the side of the one of the territories, to a time, during which the center line is present on the side of the one of the territories and a second time by adding a time that is obtained by applying a weight to a time, during which it is detected that the center line disappears on a side of the other one of the territories, to a time, during which the center line is present on the side of the other one of the territories and outputting an index as to which one of the teams is more superior in the game based on the first time and the second time.

* * * * *